US009287931B2

(12) United States Patent
Cornil et al.

(10) Patent No.: US 9,287,931 B2
(45) Date of Patent: Mar. 15, 2016

(54) COMMUNICATION SYSTEM HAVING REDUCED CROSSTALK ESTIMATION COMPLEXITY

(75) Inventors: Jean-Philippe Cornil, Enghein (BE); Miguel Peeters, Woluwe-Saint Pierre (BE)

(73) Assignee: Broadcom Corporation, Irvine, CA (US)

( * ) Notice: Subject to any disclaimer, the term of this patent is extended or adjusted under 35 U.S.C. 154(b) by 236 days.

(21) Appl. No.: 13/435,268

(22) Filed: Mar. 30, 2012

(65) Prior Publication Data

US 2013/0259210 A1 Oct. 3, 2013

(51) Int. Cl.
  H04M 1/76 (2006.01)
  H04B 3/487 (2015.01)
  H04L 27/34 (2006.01)
  H04L 25/03 (2006.01)

(52) U.S. Cl.
  CPC .............. *H04B 3/487* (2015.01); *H04L 27/345* (2013.01); *H04L 2025/03426* (2013.01)

(58) Field of Classification Search
  CPC .................................. H04B 3/32; H04B 3/464
  USPC ........... 379/22.02, 417, 335, 22.08, 145, 343, 379/392.01, 416; 370/201, 252, 317, 229
  See application file for complete search history.

(56) References Cited

U.S. PATENT DOCUMENTS

| 8,243,578 B2 * | 8/2012 | Kramer et al. ................. 370/201 |
| 2008/0285740 A1 | 11/2008 | Schelstraete et al. | |
| 2009/0310502 A1 * | 12/2009 | Nuzman et al. ................ 370/252 |
| 2010/0034249 A1 * | 2/2010 | Schenk et al. .................. 375/227 |
| 2010/0311343 A1 * | 12/2010 | Keerthi ......................... 455/63.1 |
| 2011/0243266 A1 * | 10/2011 | Roh ................................. 375/261 |
| 2012/0106315 A1 * | 5/2012 | Chow .............................. 370/201 |

FOREIGN PATENT DOCUMENTS

| CN | 102388588 | | 3/2012 | |
| EP | 1998464 A1 | | 12/2008 | |
| EP | 2 219 316 | * | 2/2009 | ............... H04L 5/00 |
| EP | 2219316 A1 | | 8/2010 | |
| KR | 10-2010-0015419 A | | 2/2010 | |

(Continued)

OTHER PUBLICATIONS

European Patent Office Communication dated Sep. 24, 2013, with European Search Report, issued in Application No. EP 13001228.9.
Office Action directed to related Korean Patent Application No. 10-2013-0034380, mailed Jun. 27, 2014; 6 pages.

(Continued)

*Primary Examiner* — Yosef K Laekemariam
(74) *Attorney, Agent, or Firm* — Sterne, Kessler, Goldstein & Fox PLLC

(57) ABSTRACT

A DSL transmitter and receiver are disclosed that efficiently estimate crosstalk interference. When transmitting over a DSL cable, each of the lines of the cable cause interference in the signals traveling though the other lines in the form of crosstalk. In order to reduce the complexity of the crosstalk estimation calculations, the transmitter sends a measurement signal whose matrix includes a plurality of sub-matrices that include less than all of the signal slots and are modulated with QAM +1s or −1s. Meanwhile, the remaining signal slots are modified with QAM 0 s, which do not require any processing during the crosstalk estimation. Rather than calculating crosstalk vectors of all lines, the receiver need only calculate the crosstalk vectors for the signal slots contained within the sub-matrices, thereby significantly reducing complexity.

22 Claims, 7 Drawing Sheets

(56) References Cited

FOREIGN PATENT DOCUMENTS

| | | |
|---|---|---|
| WO | WO 2004/006492 A1 | 1/2004 |
| WO | WO 2008/124195 A1 | 10/2008 |

OTHER PUBLICATIONS

Office Action mailed Sep. 17, 2015, directed to Chinese Application No. 201210559806, filed Dec. 20, 2012; 7 pages.

* cited by examiner

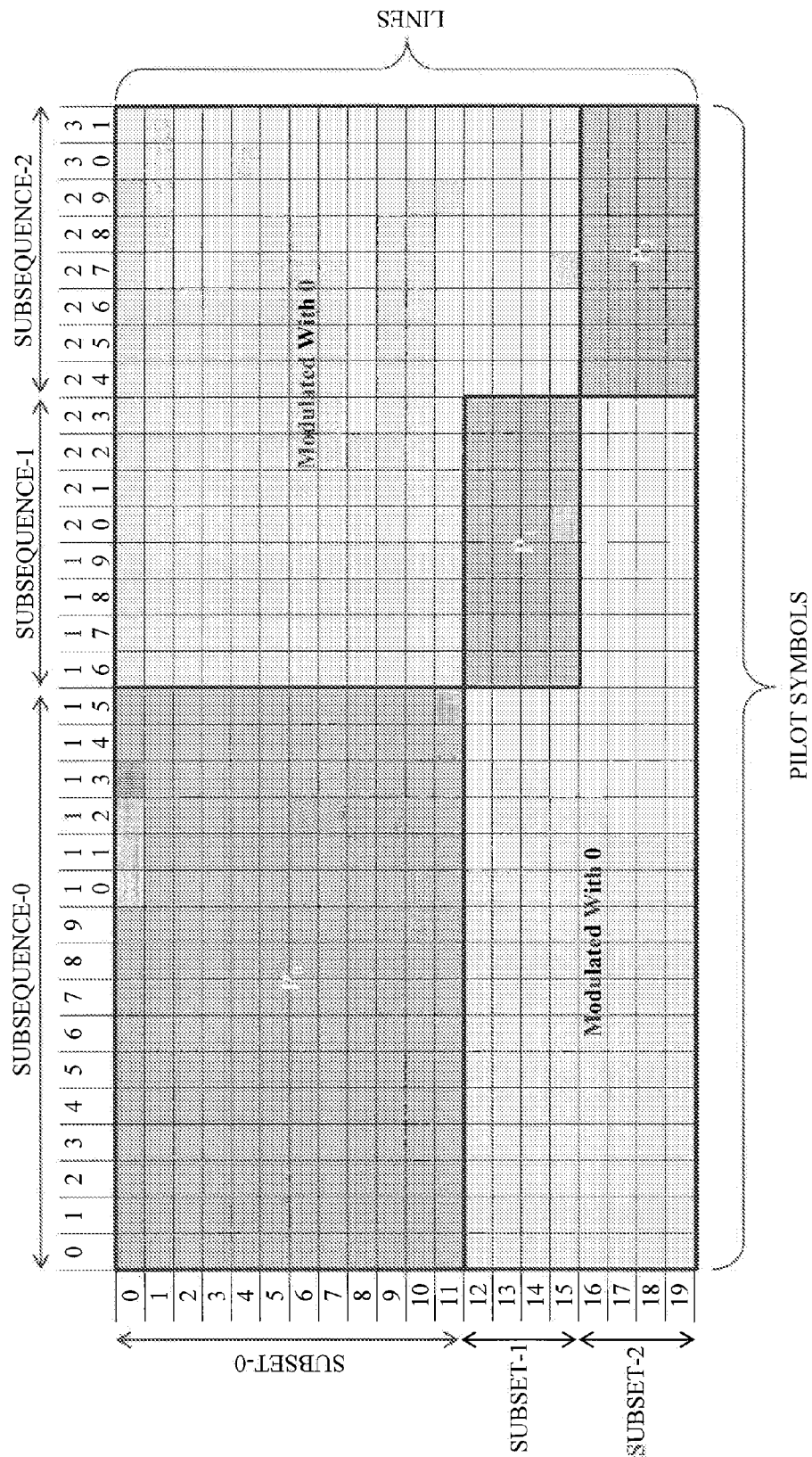

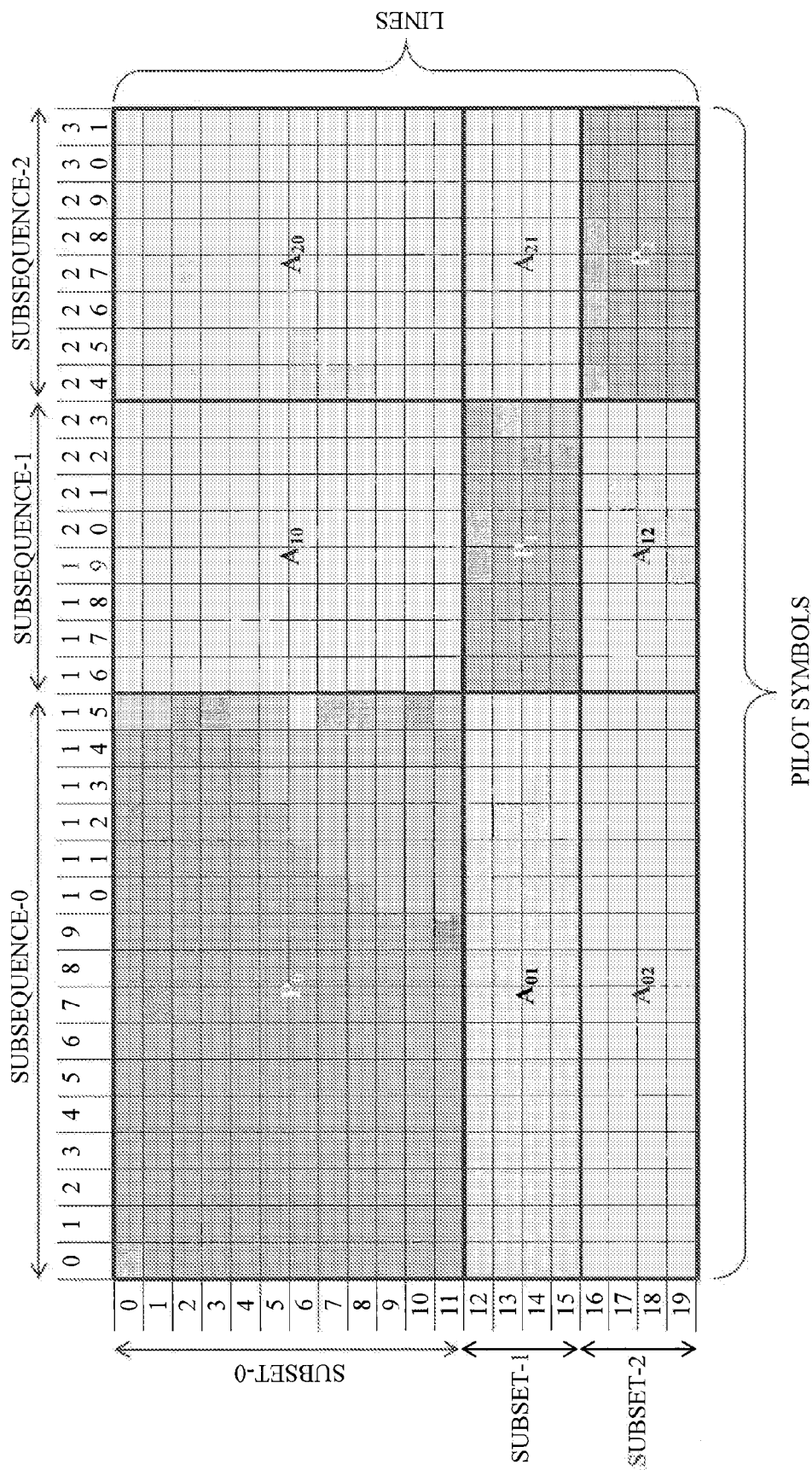

COMMUNICATION SYSTEM HAVING REDUCED CROSSTALK ESTIMATION COMPLEXITY

FIELD OF INVENTION

The invention relates to an electronics device, and more specifically relates to a transmitter and receiver in a DSL communication system.

BACKGROUND

Related Art

In DSL (Digital Subscriber Line) communications, a transmitter and receiver communicate with one another over a plurality of "lines." Each line includes a twisted pair of wires for communicating information. Each of the lines is typically loaded with different information so as to allow for parallel communication, and increased throughput.

Because the lines are loaded differently, the lines will interfere with one another in the form of crosstalk. The crosstalk may be generated by undesired capacitive, inductive, or conductive coupling between the lines, and will cause an undesired effect on the information being transmitted in those lines.

For example, data communicated in DSL is often transmitted as a QAM (Quadrature Amplitude Modulation) signal in which binary data is represented by an amplitude and phase corresponding to a particular location on a quadrature constellation. While being transmitted through a particular line, the crosstalk generated in the line from the other lines may cause a shift in the amplitude and/or phase of the signal, thereby causing a receiver of the data to misread the binary data contained within the signal as corresponding to a different location of the quadrature constellation. In other words, crosstalk can cause bit errors in transmitted data or limit distance between two points of a constellation and therefore limit achievable signal-to-noise ratio (SNR).

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

FIG. 3A illustrates a graphical representation of an exemplary modulation scheme for measuring crosstalk with reduced complexity;

FIG. 3B illustrates a graphical representation of another exemplary modulation scheme for measuring crosstalk with reduced complexity;

Figure 1A:
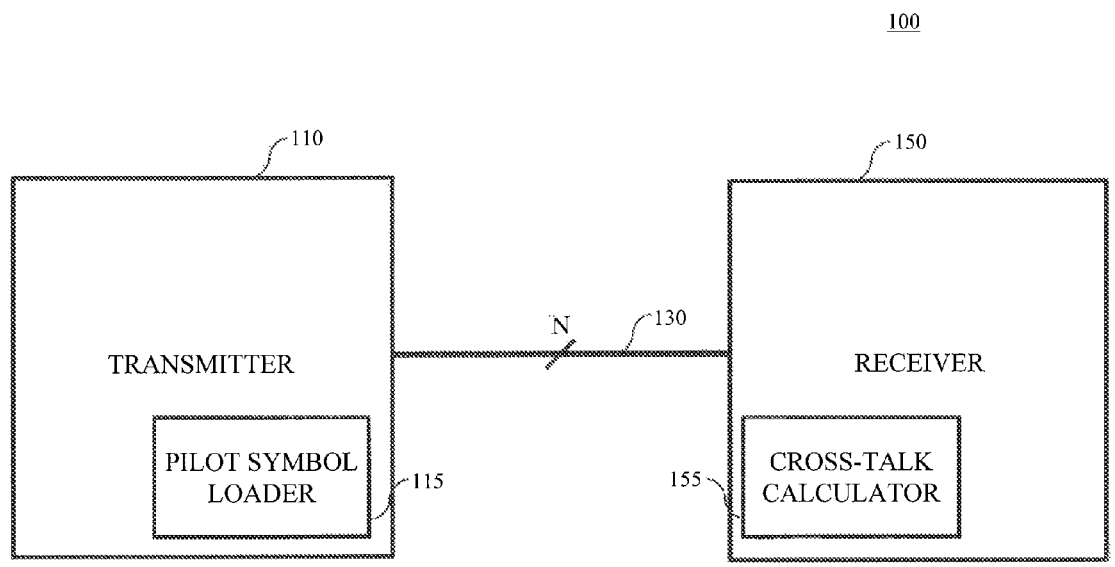
FIG. 1A illustrates a block diagram of an exemplary DSL communication environment.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are riot limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments of the disclosure may be implemented in hardware (e.g., circuits), firmware, software, or any combination thereof. Embodiments of the disclosure may also he implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although several portions of the description of the present disclosure may be described in terms of wired devices, those skilled in the relevant art(s) will recognize that the present disclosure may be applicable to any other devices without departing from the spirit and scope of the present disclosure.

An Exemplary DSL Communication Environment for Reducing Complexity of Crosstalk Measurements FIG. 1A illustrates a block diagram of an exemplary DSL communication environment 100. The DSL communication environment 100 includes a transmitter 110 and a receiver 150 that communicate with each other via a cable 130, which includes N lines of twisted wire pairs.

When seeking to measure the crosstalk between the lines of the cable 130, the transmitter 110 loads pilot symbols onto the lines, where the pilot symbols contain predetermined values so that the crosstalk can be measured by the receiver 150. Therefore, the transmitter 110 includes a pilot symbol loader 115 for loading the pilot symbols and the receiver 155 includes a crosstalk calculator 155 for measuring the crosstalk in the lines based on the received pilot symbols.

Figure 1B:
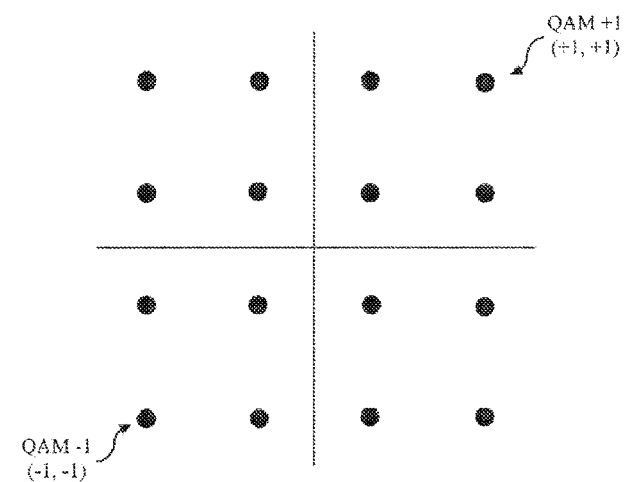
FIG. 1B illustrates a QAM constellation with QAM+1 and QAM−1 constellation values.
Figure 1C:
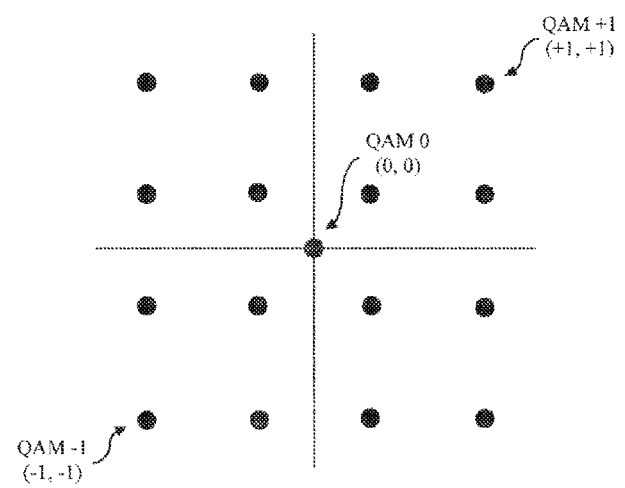
FIG. 1C illustrates a QAM constellation with QAM+1 and QAM−1 constellation values, and QAM−0.

Conventional DSL transmitters generate pilot symbols having values of exclusively QAM+1 (e.g. (+1, +1) on a QAM constellation) and QAM−1 (e.g. (−1, −1) on a QAM constellation). QAM+1 and QAM−1 typically have the maximum signal amplitude, and are the maximum distance from each other in any QAM constellation, as shown in FIG. 1B. In the present disclosure, the pilot symbol loader 115 of the transmitter 110 generates pilot symbols that include QAM−0 (e.g. (0, 0) on the QAM constellation), in addition to the pilot symbols with QAM±1 values, as shown in FIG. 1C. QAM−0 is located at the origin of the QAM constellation and preferably has substantially zero amplitude, so that no pilot data or tone may be transmitted during the allocated slot of the QAM−0. As will be shown, the QAM−0 pilot symbols are introduced in an organized fashion with the QAM±1, so as to reduce crosstalk measurement complexity, as discussed in further detail below. It is noted that FIGS. 1B and 1C illustrate 16-QAM, but other constellation orders could be used as will be understood by those skilled in the arts.

Exemplary DSL Transmitter

Figure 2:
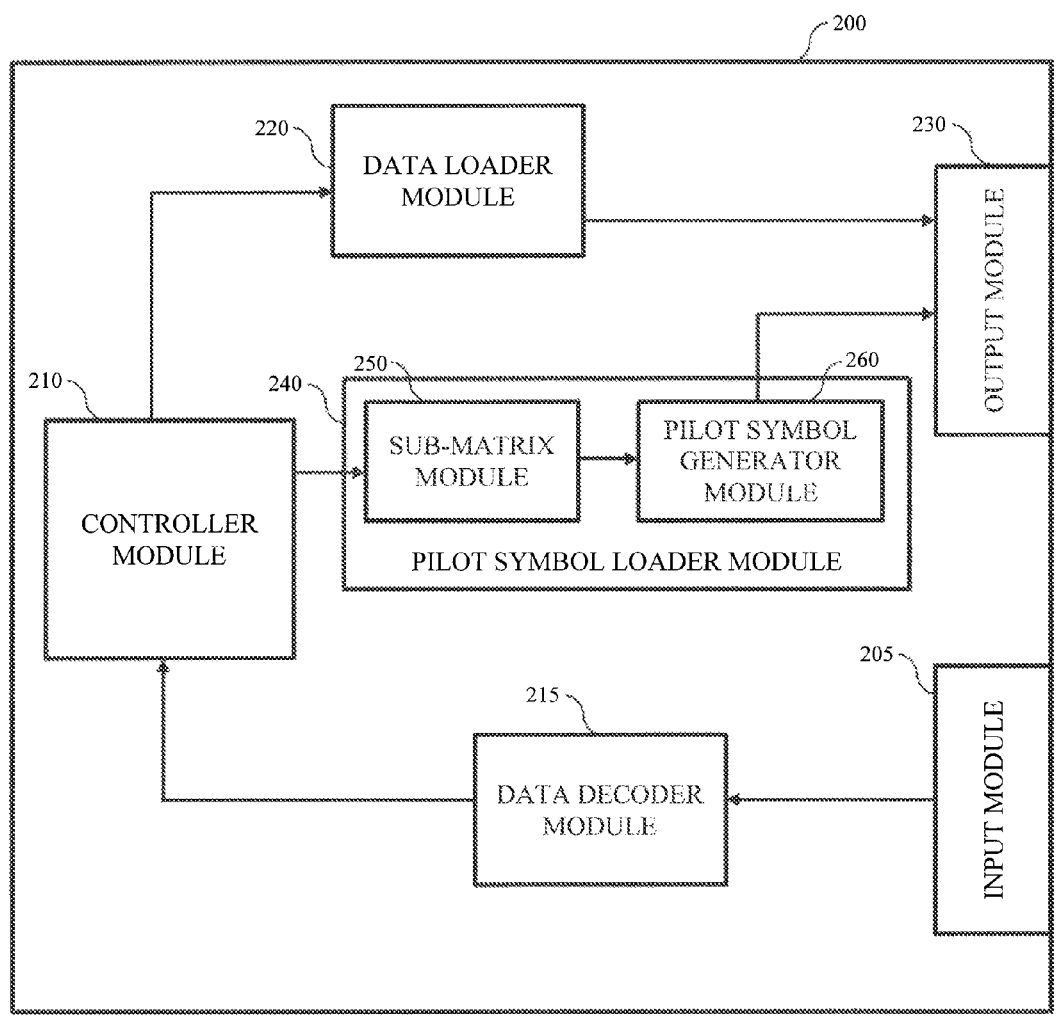
FIG. 2 illustrates a block diagram of an exemplary DSL transmitter.

FIG. 2 illustrates a block diagram of an exemplary DSL transmitter 200 that may be implemented within the DSL communication environment 100. The transmitter 200 includes a sub-matrix module 250 as part of its pilot symbol loader module 240, and may represent an exemplary embodiment of the transmitter 110.

1. Standard Communication Mode

The transmitter 200 includes a controller module 210 that may control the operations of the additional components within the transmitter 200 and/or may perform various processing operations. The transmitter also includes a data decoder module 215 and a data loader module 220. During standard communication, the data loader module 220 receives data from the controller module 210 that is to be transmitted to a receiver. The data loader module 220 modulates the data in accordance with corresponding QAM parameters (adjusted based on crosstalk measurements, discussed below), and generates data symbols that include the modulated data. Each data symbol includes the data to he transmitted over a plurality of the N lines in a single time-domain unit interval.

Once the data loader module 220 has generated the data symbols, those data symbols are forwarded to an output module 230. The output module 230 loads the data symbols onto a corresponding number of the N lines for output to a receiver.

Similarly, the transmitter 200 can also receive information via its input module 205. Once received, the input module 205 forwards the received signals to the data decoder module 215, which decodes the received signals to retrieve the data contained therein. The decoding can be performed by comparing the received amplitude and phases of the received signals to locations within a QAM constellation. The data decoder module 215 then forwards the decoded data to the controller module 210 for further processing.

2. Measurement Mode

Occasionally, the controller module 210 may initiate a measurement mode in order to measure the crosstalk among the N lines of the DSL communication cable. By measuring the crosstalk in the lines, the transmitter 200 can compensate transmit data during data loading in order to cause data symbols to be received with higher accuracy. Therefore, the transmitter 200 includes a pilot symbol loader module 240. The pilot symbol loader module 240 includes a sub-matrix module 250 and a pilot symbol generator module 260.

FIG. 3 illustrates a graphical representation of an exemplary modulation scheme for measuring crosstalk with reduced complexity. As shown in FIG. 3, an example system includes 20 data lines and has a measurement period of 32 unit time intervals. Each of the unit time intervals is loaded with a corresponding pilot symbol (column) during the measurement mode. A pilot signal, as described herein, includes a plurality of pilot symbols. Accordingly, a pilot signal includes a plurality of slots arranged in a matrix, each row of the matrix corresponding to one communication line of a plurality of communication lines, and each column of the matrix corresponding to a unit transmission time interval for pilot data to be transmitted on each of the plurality of communication lines. Additionally, each matrix slot of pilot data may carry one more frequency tones that are modulated with the pilot data, to include QAM values.

As discussed above, typical crosstalk measuring methods simply load all N lines with QAM values of +1s or −1s during all unit time intervals, meaning the pilot tones in each slot are modulated with either QAM+1 or QAM−1. However, this approach requires significant computation at the receiver. For example, assume that the column vector of a sent signal of a pilot symbol l sent on one given sub-carrier of the N lines is $\overline{u}_l = [u_{0,l} \ldots u_{N-1,l}]^t$, and that the column vector of the received signal at the pilot symbol l on the same sub-carrier of the N lines is $\overline{v}_l = [v_{0,l} \ldots v_{N-1,l}]^t$. In addition, assume that the crosstalk $C=[Cij]$ is an N×N channel matrix whose non-diagonal term represents the crosstalk channel from the line i (the "disturbing line") into line j (the "victim line") for the same sub-carrier. Then, $$\overline{v}_l = C \cdot \overline{u}_l \tag{1}$$

Using similar logic, the computation can be expanded from a single pilot symbol to a plurality of M consecutive pilot symbols. For example, matrices U and V of dimension N×M represent M consecutive pilot symbols transmitted and received, respectively, over the N lines. In this case, $$U = [\overline{u}_0 \ldots \overline{u_{M-1}}],\quad(2)$$

$$V = [\overline{v}_0 \ldots \overline{v_{M-1}}], \text{ and}\quad(3)$$

$$V = C \cdot U,\quad(4)$$

$$\therefore C = V \cdot W,\quad(5)$$

where W is the inverse of U. In G.993.5 (DSL specification, incorporated herein by reference), the matrix U is composed from a product of a complex diagonal matrix D of dimension (N×N) and a rectangular matrix P of dimension N×M whose elements are only +1 or −1. The matrix V can be derived from the error sampled retrieved from the $k^{th}$ row of the matrix P, referred to as a pilot sequence of the $k^{th}$ line.

Selecting the pilot sequences (rows of FIG. 3) from rows of a Hadamard matrix allows computation to be simplified such that $P \cdot P^T = \alpha \cdot I$, where $P^T$ is the transpose of matrix P and I is the $\alpha \times \alpha$ identity matrix. Such a P matrix can be derived by choosing for each pilot sequence, a different row of a Hadamard matrix of dimension M, provided that M is greater than or equal to N. In this manner, the crosstalk in line i from line j can be computed as:

$$c_{ij} = \frac{1}{\alpha d_j} \sum_{l=0}^{M-1} v_{il} p_{jl}\quad(6)$$

Using this equation, when measurement matrix is loaded entirely with +1s and −1s, the total number of elementary multiplications by +1, −1 required to estimate the full crosstalk matrix for N lines is (M×N×N). As discussed above, M must be greater than or equal to N, meaning that the resulting complexity of the algorithm for the estimation of the crosstalk matrix of dimension N×N is of the order ($N^3$).

Consequently, the transmitter 200 includes a sub-matrix module 250 that designates sub-matrices within the measurement matrix. The designated sub-matrices will be modulated with QAM +1s and QAM −1s, whereas the remainder of the matrix will be modulated as QAM 0s.

As shown in FIG. 3, the sub-matrix module 250 may, for example, designate a first sub-matrix $P_0$ as the overlap between a first subset of lines (e.g. lines 0-11) and a first subsequence of pilot symbols (e.g. symbols 0-15), a second sub-matrix $P_1$ as the overlap between a second subset of lines (e.g. lines 12-15) and a second subsequence of pilot symbols (e.g. symbols 16-23), and a third sub-matrix $P_2$ as the overlap between a third subset of lines (e.g. lines 16-19) and a third subsequence of pilot symbols (e.g. symbols 24-31). Each of the designated sub-matrices are depicted in FIG. 3 as a dark-grey box.

Once the sub-matrices have been designated, the pilot symbol generator module 260 generates the symbols that will satisfy the layout of the sub-matrices. In other words, the pilot symbol generator module 260 will generate pilot symbols to populate the designated sub-matrices with QAM +1s and −1s, and populate the remaining space with QAM 0s. For example, the pilot symbol generator module 260 will generate pilot symbol 0 (shown in FIG. 3) to have QAM values of +1 and −1 for lines 0-11, and QAM−0s for the remaining lines 12-19. Similarly, the pilot symbol generator module will generate pilot symbol 20 to have QAM−0 for lines 0-11, and QAM +1s and −1s for lines 12-15, and then QAM−0 for remaining lines 16-19. The sub-matrices are not limited to the configuration shown in FIG. 3, as one skilled in the art will realize that other sub-matrix configurations could be used based on the discussion provided herein. Further, other pre-determined non-zero QAM values could be used instead of QAM+1, and QAM−1 to define the sub-matrices, and QAM−0 could be replaced with non-QAM−0 values not contributing to $c_{ij}$ (discussed below), as will be understood by those skilled in the arts based on the discussion give herein.

Once the pilot symbol generator module 260 has generated the pilot symbols, the pilot symbols are forwarded to the output module 230 to be transmitted onto the lines for communication to the receiver. As noted above, the pilot symbols may be forwarded and uploaded on a ready basis. The pilot symbol generation performed by the loader module 240 may be performed in the digital domain. Accordingly, the output module 230 may further include transmitter front-end processing as necessary to generate transmit signals appropriate for DSL transmission. The front-end processing can included digital-to-analog (D/A) conversion, filtering, amplification, frequency up-conversion, in order to generate a DSL analog output signal, or other analog output signal.

Exemplary DSL Receiver

Figure 4:
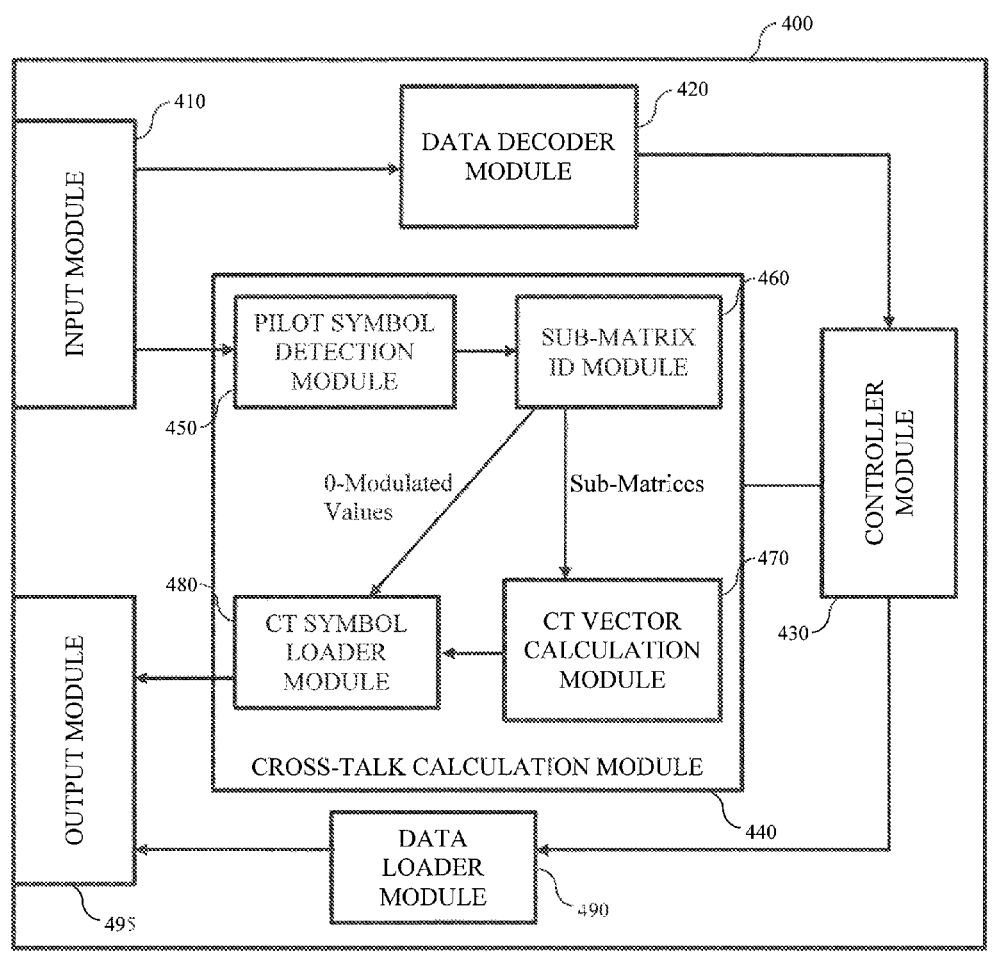
FIG. 4 illustrates a block diagram of a DSL receiver.

FIG. 4 illustrates a block diagram of an exemplary DSL receiver 400 that may be implemented within the DSL communication environment 100. The receiver 400 includes a sub-matrix identification module 460 as part of its crosstalk calculation module 440, and may represent an exemplary embodiment of the receiver 150.

1. Standard Communication Mode

During standard communication, the receiver 400 receives signals at its input module 410, that may include a front-end module (not shown) to perform one or more of amplification, down-conversion, filtering, and analog-to-digital conversion. The input module 410 forwards the received signals to a data decoder module 420, which demodulates and/or decodes the received signals. The received signals can be decoded by comparing their amplitudes and phases to corresponding positions within a QAM constellation. The data decoder module 420 forwards the resulting data to the controller module 430 for further processing. The controller module 430 may perform signal processing on the decoded signals, and/or may perform general control operations of the receiver 400.

The receiver 400 may also transmit signals via its output module 495, or have access to a transmitter in a transceiver configuration. The data for such signals may be generated by the controller module 430 and forwarded to a data loader module 490. The data loader module operates substantially similarly to the data loader module 220 of the transmitter 200, and encodes/modulates the data for transmission. The data loader module 490 forwards the encoded signal to the output module 495, which loads the encoded signal onto the N lines of the DSL cable for transmission.

2. Measurement Mode

As discussed above, a transmitter may occasionally initiate a measurement mode in order to measure the crosstalk among the N lines of the DSL communication cable. In doing so, the transmitter transmits a plurality of pilot symbols that are modulated only with QAM +1s, −1s and 0s. When the signal is received by the input module 410 of the receiver 400, the receiver 400 first identifies whether the received signal is a measurement mode signal. In one embodiment, the measurement mode occurs at a predefined time such that the receiver 400 knows when the measurement mode will occur. However, in another embodiment, the receiver 400 may need to identify the measurement mode. In order to make this determination, the input module 410 forwards received signals to both the data decoder module 420 and a pilot symbol detection module 450 within the crosstalk calculation module 440.

The pilot symbol detection module 450 analyzes the received signal to determine whether it is composed of pilot symbols. The pilot symbol detection module 450 can make this determination by examining the modulation of the received signal. Because noise and crosstalk will have affected the signal during transmission, it will no longer include exact QAM +1s, −1s and 0s that are used for the pilot symbols. However, for a measurement mode signal, the values contained within the symbols should be occurring substantially near to each of those measurement values. Therefore, the pilot symbol detection module 450 can determine whether the signal contains pilot symbols by determining an average proximity of each of the received values to the nearest of QAM +1, −1 and 0, and comparing that proximity to a predetermined threshold.

If the pilot symbol detection module 450 determines that the signal does not include pilot symbols, the signals continue to be processed by the data decoder module 420 and controller module 430 as during standard communication mode. If, however, the pilot symbol detection module 450 determines that the received signal does include pilot symbols, the pilot symbol detection module 450 identifies the received signal as a measurement signal, and causes the crosstalk calculation module 440 to inform the controller module 430 accordingly. In this manner, the controller module 430 knows not to perform any processing of its own on the received signal and/or may control the data decoder module 420 to stop operation during the measurement period (the period of time required to receive the measurement signal).

Regardless of how the measurement mode is identified, once the receiver identifies the measurement signal, the pilot symbol detection module 450 forwards the received signal to the sub-matrix ID module 460. The sub-matrix ID module 460 determines the locations and boundaries of the sub-matrices contained within the measurement signal. Because the pilot symbol detection module 450 has already identified the signal as being modulated with only +1s, −1s and 0s, the sub-matrix ID module 460 can analyze the tone contained within each slot (cross-section between a pilot symbol and a line in FIG. 3) to determine if it is closest to a QAM +1, a QAM −1 or a QAM 0. Once the sub-matrix ID module 460 has identified the values of the slots, it can then determine the locations of the sub-matrices as the groups of slots containing the QAM +1s and QAM −1s.

The sub-matrix ID module 460 can also perform interpolation to correct possible misidentifications. Specifically, because the sub-matrices encompass groups of QAM +1s and QAM −1s, slots that are surrounded by +1s and −1s, but which are identified as QAM 0, can be determined to actually be a +1/−1 based on its location in the sub-matrix. Similarly, a slot identified as a QAM +1/−1 surrounded by QAM 0s can be determined to actually be a QAM 0.

As discussed above, the crosstalk/noise in the DSL cable will cause distortion in the received signal. QAM +1 and QAM −1 are each located at opposite locations in the QAM constellation relative to QAM 0, so as to minimize error. However, if the distortion is significant enough, it is possible for a QAM 0 to be distorted to be closer to QAM +1 or QAM −1, and therefore be misidentified. Similarly, a QAM +1 or QAM −1 may be distorted so as to be closer to QAM 0, and similarly be misidentified. Therefore, the sub-matrix ID module 460, when identifying the locations and boundaries of the sub-matrices contained within the signal matrix, may also identify these erroneously-identified slots based on their positions within the matrix.

Using FIG. 3 as an example, the sub-matrix ID module 460 may identify a QAM 0 located at the slot corresponding to line 3, pilot symbol 6. As shown in FIG. 3, this slot is surrounded on all sides by slots identified as either containing a QAM +1 or a QAM −1. Therefore, the slot is identified as either a QAM +1 or QAM −1, based on which of those points is closer to the actual amplitude and phase of the erroneous slot on the QAM constellation, and therefore includes the slot in the sub-matrix $P_0$. Similarly, the sub-matrix ID module 460 may identify a QAM +1 or QAM −1 in the slot corresponding to line 18, pilot symbol 19, which is surrounded on all sides by a QAM 0. Consequently, the sub-matrix ID module 460 identifies this slot as also being a QAM 0, and does not identify it as a sub-matrix.

Once the sub-matrices have been identified, the sub-matrix ID module 460 forwards the values contained within each of the sub-matrices to a crosstalk vector calculation module 470, whereas slots determined to be 0-modulated (contain a QAM 0) are forwarded to a crosstalk symbol loader module 480 for later use (discussed below).

The CT vector calculation module 470 receives the values of the sub-matrices, and performs the crosstalk estimation calculations on those values. Specifically, the CT vector calculation module 470 determines, for each slot of the received signal, an adjustment vector that represents an amplitude and phase shift caused by the crosstalk within the DSL communication cable on that particular slot. This can be performed by determining the distance vectors between each received value of the sub-matrix to its expected value (QAM +1 or QAM −1). For example, in a 4-QAM system, an expected QAM +1 (+1, +1) is received as (+0.8, +1.04). The CT vector calculation module 470 determines an adjustment vector of received-expected=(−0.2, +0.04) for that particular slot.

Once similar vectors have been calculated for the other slots of each of the sub-matrices, the resulting vectors are forwarded to the crosstalk symbol loader module 480. The CT symbol loader module 480 generates a return signal that includes the various adjustment vector. Specifically, the CT symbol loader module 480 generates a signal matrix substantially similar to that of FIG. 3. In each sub-matrix, the CT symbol loader module 480 injects the adjustment vectors calculated by the CT vector calculation module 470 at their corresponding slots.

As discussed above, the CT symbol loader module 480 also receives the 0-modulated values directly from the sub-matrix ID module 460. The values of the 0-modulated slots correspond directly to the adjustment values for those slots, because they directly depict the offset from the expected value (QAM 0 ). For example, in a 4QAM system, an expected QAM 0 (0, 0) is received as (−0.06, +0.1). Thus, the adjustment vector is (−0.06, +0.1)−(0, 0)=(−0.06, +0.1). Therefore, for slots not included within one of the sub-matrices, the CT symbol loader module 480 simply loads the values received from the sub-matrix ID module 460 into their corresponding slots. The resulting signal is then forwarded to the output module 495 for output.

3. Reduced Calculation Complexity

Because the vectors are only calculated for the slots contained within the sub-matrices, and not for each slot within the received signal matrix, the complexity of the estimation process can be significantly reduced.

For example, using the above method, the overall signal matrix P can be represented as:

$$P = \begin{bmatrix} P_0 & 0 & \cdots & 0 \\ 0 & P_1 & \cdots & 0 \\ \vdots & \vdots & \ddots & \vdots \\ 0 & 0 & \cdots & P_K \end{bmatrix}, \quad (7a)$$

where each matrix $P_k$ represents one of the sub-matrices of the received signal (e.g., $P_0$, $P_1$, etc.) having dimension ($N_k$, $M_k$) with elements equal to +1 or −1, and each 0 represents a sub-matrix of QAM–0 values.

It should be understood that similar reduction of complexity of the estimation process can be achieved by replacing the 0 sub-matrices with non-QAM–0 sub-matrices $A_{jk}$, as shown in FIG. 3B. FIG. 3B is substantially the same as FIG. 3A, but replaces the areas indicated as being "Modulated with 0" with non-QAM–0 sub-matrices A. In this case, the P matrix can be represented as:

$$P = \begin{bmatrix} P_0 & A_{10} & \cdots & A_{j0} \\ A_{01} & P_1 & \cdots & A_{j1} \\ \vdots & \vdots & \ddots & \vdots \\ A_{0k} & A_{1k} & \cdots & P_K \end{bmatrix}. \quad (7b)$$

In this matrix, each of the A sub-matrices may include values other than QAM–0, such as QAM+1 and QAM−1, for example, provided that each A sub-matrix is chosen such that its arrangement of elements do not correlate with corresponding P sub-matrices. In other words, each $A_{jk}$ sub-matrix in a particular column K should be chosen such that $A_{jk} \cdot P_K^T = 0$. In order to satisfy this requirement, the A sub-matrices can be built by choosing as rows the remaining Hadamard sequences of dimension $N_k$, provided that $N_k > M_k$ that are not included within the corresponding P sub-matrix. Multiple rows of the matrix A can be identical.

Using either of the Hadamard relationships described above, the matrix of a transmitted symbol U=D·P, and if the matrix $P_k$ is selected such that $P_k \cdot P_k^T = \alpha_k \cdot I_k$, where $I_k$ is an identify matrix of dimension ($N_k \times N_k$), then:

$$P \cdot P^T = \begin{bmatrix} \alpha_0 I_0 & 0 & \cdots & 0 \\ 0 & \alpha_1 I_1 & \cdots & 0 \\ \vdots & \vdots & \ddots & \vdots \\ 0 & 0 & \cdots & \alpha_k I_k \end{bmatrix}. \quad (8)$$

Accordingly, the matrix W can be defined as:

$$W = P^T \cdot \begin{bmatrix} I_0/\alpha_0 & 0 & \cdots & 0 \\ 0 & I_1/\alpha_1 & \cdots & 0 \\ \vdots & \vdots & \ddots & 0 \\ 0 & 0 & 0 & I_k/\alpha_k \end{bmatrix} \cdot D^{-1}. \quad (9)$$

By applying this matrix to equation (5) and developing the terms as in equation (6), the crosstalk coefficient that represents the crosstalk injected into the line i from the line j, which is part of the $k^{th}$ subset of lines is given by:

$$c_{ij} = \frac{1}{\alpha_k d_j} \sum_{l=0}^{M_k-1} v_{i(l_k+l)} \cdot p^{(k)}_{(j-i_k)l} \quad (10)$$

where $p^{(k)}$ are the elements of the matrix $P_k$, $l_k$ is the symbol number of the sub-matrix, l is the symbol number of the matrix at which the sub-matrix begins, and $i_k$ is the line number of the sub-matrix.

Comparing a primary difference between equation (10) and equation (6), equation (10) is a summation over $M_k$, whereas equation (6) is a summation over M. Because $M_k$ is less than N, the overall complexity of the estimation calculation becomes $O(N^2 M_k)$. Therefore, performing the crosstalk estimation in this manner reduces the overall computation by an order.

Applying this complexity to the example of FIG. 3, a conventional crosstalk estimation requires performing 20 multiplications (20 lines) for each slot of the full 20×32 matrix, resulting in a multiplication complexity of 20*20*32=12800. Meanwhile, the estimation method of the present disclosure requires performing 20 multiplications (20 lines) for each slot contained within the 12×16, 4×8, and 4×8 sub-matrices, resulting in a multiplication complexity of 20*(12*16+4*8+4*8)=5120. As can be seen from this example, applying the method of the present disclosure results in a 60% improvement over the conventional method.

Exemplary Crosstalk Compensation

As discussed above, the receiver 400 preferably determines individual compensation vectors for each slot of the signal matrix. However, in some circumstances it may be desired to adjust slots uniformly over each individual line, symbol, or matrix. In this case, the receiver 400 can simply average the vector values of the desired group of slots to arrive at a compensation vector for the group. For example, if adjustment is to be performed on a line-by-line basis, the receiver 400 may simply average the compensation vectors of the slots within a line to arrive at that line's compensation vector.

Regardless of how the compensation parameters are defined, once they have been calculated by the receiver, the transmitted signal can be adjusted to compensate for the crosstalk.

1. Transmitter Compensation

As discussed above, once the receiver 400 has calculated the compensation vectors, the receiver 400 may forward those compensation vectors to the transmitter 200. The transmitter 200 receives the compensation vectors via its input module 205 in the form of a signal. This signal can then be decoded by the data decoder module 215 and forwarded to the controller module 210 for future use.

During standard communication, the controller module 210 may forward data for transmission to the data loader module 220 along with the compensation vectors previously stored. The data loader module 220 may then utilize those vectors to predistort the information and/or modulation values of the outgoing data symbols. This can be performed simply by subtracting the compensation vector from the desired data vector. For example, a compensation vector of (−0.2, +0.04) indicates the expected shift of the data value of that particular slot. For example, based on this compensation vector, an outgoing QAM 1 (+1, +1) is expected to be received by the receiver 400 as (+0.8, +1.04). Accordingly, subtracting the compensation vector from the actual signal gives (+1, +1)−(−0.2, +0.04)=(+1.2, +0.96), which should be received by the receiver at or very near to (+1, +1) after the crosstalk in the lines has occurred during transmission.

Accordingly, the transmitter 200 introduces predistortion during data symbol generation to cancel effects of transmission line crosstalk that occur during transmission, which allows for the actual desired value (or a value close thereto) to be received by the receiver 400.

2. Receiver Compensation

As an alternative to predistortion, compensation may be performed by the receiver 400. Specifically, rather than forwarding the compensation vectors to the transmitter for use, the receiver 400 may simply store those vectors for its own use. Once stored, the receiver 400 may undistort received signals based on the stored compensation vectors. Again, this can be performed simply by subtracting the compensation vector from the values of a corresponding slot of a received signal.

Using the above example, without predistortion, the transmitted QAM 1 (+1, +1) will undergo distortion from the crosstalk during transmission. After the crosstalk interference, that value may have shifted to (+0.8, +1.04). Subtracting the compensation vector corresponding to this slot gives (+0.8, +1.04)−(−0.2, +0.04)=(+1, +1). As such, the actual value of the signal can be retrieved on the receiver 400 side using post-distortion techniques.

Those skilled in the relevant art(s) will recognize that similar techniques may be available within the spirit and scope of the present disclosure and that the above examples are only examples, and do not limit the disclosure in any way.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
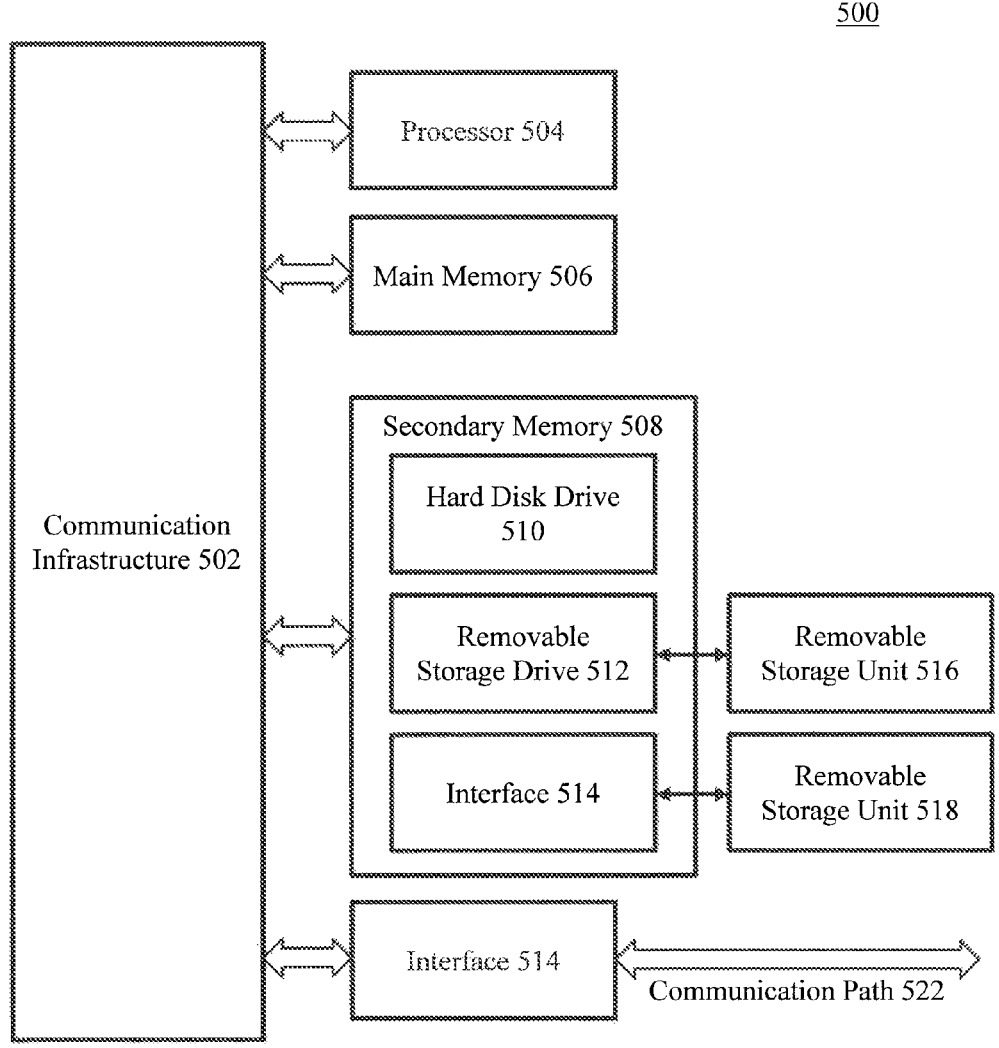
FIG. 5 illustrates a block diagram of an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. One or more of the modules depicted in the previous figures can be implemented by one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Abstract, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Further, the invention should not be limited by any of the above-described exemplary embodiments, but should be defined only in accordance with the following claims and their equivalents.

What is claimed is:

1. A transmitter capable of communicating signals via at least one communication line, comprising:
   a pilot symbol loader module configured to generate a pilot signal for transmission through the at least one communication line, the pilot signal including at least one QAM 0 sub-matrix, the QAM 0 sub-matrix being a sub-matrix of pilot signal slots that are each loaded with a QAM 0 value, the pilot symbol loader module including:
      a pilot symbol generator module configured to fill the at least one QAM 0 sub matrix with QAM 0 values, and to fill areas of the pilot signal that are not within the at least one QAM 0 sub-matrix with QAM values selected from a determined subset of M values that do not include QAM 0 values,
   wherein the QAM 0 value is located at an origin of a corresponding QAM constellation, and
   wherein the pilot signal is to be used for estimating transmission crosstalk.

2. The transmitter according to claim 1, wherein the pilot signal is represented by a plurality of slots arranged in a matrix, each row of the matrix corresponding to one communication line of the at least one communication line, and each column of the matrix corresponding to a unit transmission time interval for data to be transferred on each of the at least one communication line so as to form a pilot symbol.

3. The transmitter according to claim 2, wherein each slot of the pilot signal includes one QAM value selected from a predetermined subset of available QAM values.

4. The transmitter according to claim 3, wherein the predetermined subset of available QAM values includes only QAM +1, QAM −1 and QAM 0.

5. The transmitter according to claim 2, wherein the pilot symbol loader module further includes:
   a sub-matrix module configured to set the at least one QAM 0 sub-matrix within the pilot signal matrix that is smaller in dimension than the pilot signal matrix.

6. The transmitter according to claim 5, wherein the first predetermined subset includes only QAM +1 values and QAM −1 values.

7. The transmitter according to claim 6, wherein the pilot symbol generator module is configured to fill one sub-matrix of the at least one sub-matrix by selecting, for each row of the one sub-matrix, a row of a Hadamard matrix having the same row dimension as the one sub-matrix.

8. A receiver capable of communicating via at least one communication line and receiving a pilot signal having a plurality of slots arranged in a matrix, comprising:
   a sub-matrix identification (M) module configured to identify locations and boundaries of at least one sub-matrix contained within the received pilot signal based on values within the plurality of slots of the pilot signal, the at least one sub-matrix being smaller in dimension than the pilot signal matrix; and
   a crosstalk vector calculation module configured to calculate a crosstalk compensation vector only for each slot contained within the at least one sub-matrix.

9. The receiver according to claim 8, further comprising a pilot symbol detection module configured to analyze a received signal in order to detect whether the received signal is the pilot signal.

10. The receiver according to claim 9, wherein the pilot symbol detection module is configured to detect whether the received signal is the pilot signal by comparing values of multiple slots of the received signal to a predetermined subset of available QAM values.

11. The receiver according to claim 8, wherein the sub-matrix ID module is configured to identify an intended value of each slot within the pilot signal from among a predetermined subset of intended values by determining to which intended value a received value of each slot is nearest.

12. The receiver according to claim 11, wherein the predetermined subset of intended values includes QAM +1, QAM −1, and QAM 0.

13. The receiver according to claim 12, wherein the sub-matrix ID module is configured to identify the location and boundary of the at least one sub-matrix by identifying groups of identified values that include only QAM +1 and QAM −1.

14. The receiver according to claim 11, wherein the sub-matrix ID module is configured to interpolate an intended value of a slot based on values contained within immediately adjacent slots.

15. The receiver according to claim 8, further comprising a crosstalk symbol loader module configured to generate a response signal having a plurality of slots arranged in a matrix and including at least one sub-matrix corresponding to the at least one sub-matrix of the received pilot signal,
   wherein the crosstalk symbol loader module fills the at least one sub-matrix of the response signal with the crosstalk compensation vectors calculated by the crosstalk vector calculation module of the corresponding slots of the received pilot signal, and
   wherein the crosstalk symbol loader module fills the slots of the response signal that are not included in the at least one sub-matrix of the response signal with received values of the corresponding slots of the received pilot signal.

16. A method of measuring crosstalk within a pilot signal, the pilot signal including a plurality of slots arranged in a matrix, the method comprising:
   receiving the pilot signal by a receiver;
   identifying, based on values within the plurality of slots of the pilot signal, at least one sub-matrix within the pilot signal that is smaller in dimension than the pilot signal matrix; and
   calculating cross-talk compensation vectors only for slots contained within the at least one sub-matrix.

17. The method according to claim 16, further comprising identifying an intended value of each slot within the pilot signal from among a predetermined subset of intended values by determining to which intended value a received value of each slot is nearest.

18. The method according to claim 17, wherein the at least one sub-matrix is identified based on locations of groups of slots whose intended values are either QAM +1 and QAM −1.

19. The method according to claim 16, further comprising:
   generating a response signal having a plurality of slots arranged in a matrix and including at least one sub-matrix corresponding to the at least one sub-matrix of the received pilot signal, the generating including:

filling the at least one sub-matrix of the response signal with the calculated crosstalk compensation vectors of the corresponding slots of the received pilot signal, and filling the slots of the response signal that are not included in the at least one sub-matrix of the response signal with received values of the corresponding slots of the received pilot signal.

20. A transmitter capable of communicating signals via at least one communication line, comprising:

a pilot symbol loader module configured to generate a pilot signal for transmission through the at least one communication line, the pilot signal including a first sub-matrix loaded with QAM 0 values located at an origin of a QAM constellation, and a second sub-matrix loaded with non-QAM 0 values that have QAM constellation locations other than the origin, the pilot symbol loader module including:

a pilot symbol generator module configured to fill the first sub-matrix with the QAM 0 values, and to fill the second sub-matrix with the non-QAM 0 values, the non-QAM 0 values being selected from a predetermined subset of QAM values that do not include QAM 0 values, wherein the pilot signal is to be used for estimating transmission crosstalk.

21. The transmitter according to claim 1, wherein the pilot symbol loader module is configured to load a plurality of pilot symbols onto corresponding ones of the at least one communication line, wherein at least two of the pilot symbols are the same.

22. The transmitter according to claim 21, wherein the at least two pilot symbols overlap with the at least one QAM 0 sub-matrix.

* * * * *